US011423662B2

(12) United States Patent
Neumann et al.

(10) Patent No.: US 11,423,662 B2
(45) Date of Patent: Aug. 23, 2022

(54) DEVICE AND METHOD FOR REMOVING OR KILLING WEEDS

(71) Applicants: Aventum GmbH, Zurndorf (AT); Andreas Schneemayer, Zurndorf (AT)

(72) Inventors: Albert Neumann, Zurndorf (AT); Andreas Schneemayer, Zurndorf (AT)

(73) Assignees: AVENTUM GMBH, Zurndorf (AT); ANDREAS SCHNEEMAYER, Zurndorf (AT)

( * ) Notice: Subject to any disclaimer, the term of this patent is extended or adjusted under 35 U.S.C. 154(b) by 0 days.

(21) Appl. No.: 17/433,112

(22) PCT Filed: Feb. 18, 2020

(86) PCT No.: PCT/EP2020/054171
§ 371 (c)(1),
(2) Date: Aug. 23, 2021

(87) PCT Pub. No.: WO2020/173752
PCT Pub. Date: Sep. 3, 2020

(65) Prior Publication Data
US 2022/0044030 A1 Feb. 10, 2022

(30) Foreign Application Priority Data
Feb. 26, 2019 (AT) .............................. A 60048/2019

(51) Int. Cl.
*G06V 20/56* (2022.01)
*A01M 21/04* (2006.01)
*H04N 7/18* (2006.01)

(52) U.S. Cl.
CPC ........... *G06V 20/56* (2022.01); *A01M 21/043* (2013.01); *H04N 7/185* (2013.01)

(58) Field of Classification Search
CPC .. G06K 9/00791; A01M 21/043; H04N 7/185
(Continued)

(56) References Cited

U.S. PATENT DOCUMENTS

2006/0239508 A1* 10/2006 Maki ................. G06K 9/00798
382/104
2017/0112118 A1 4/2017 MacKenzie
(Continued)

FOREIGN PATENT DOCUMENTS

CN 204930106 U 1/2016
DE 102017205293 A1 10/2018
EP 3357332 A1 8/2018

OTHER PUBLICATIONS

International Search Report (Form PCT/ISA/210) for International Application No. PCT/EP2020/054171 dated May 29, 2020, 5 pages including English translation.
(Continued)

*Primary Examiner* — Joseph G Ustaris
*Assistant Examiner* — Matthew David Kim
(74) *Attorney, Agent, or Firm* — Withrow & Terranova, P.L.L.C.; Vincent K. Gustafson

(57) ABSTRACT

A device for removing or killing weeds, comprising a first image capturing apparatus for capturing a first ground image, a data processing unit connected thereto and an agricultural machine controlled by the data processing unit, which is designed for the targeted removal or killing of weeds, wherein the data processing apparatus is configured to receive the first ground image from the first image capturing apparatus, to receive manually determined position data from at least one connected terminal, which indicate the position of weeds and/or crops and/or ground structures, e.g. rows of plants, which have been detected in the first ground image by one or more users, and, on the basis of the position data, to control the agricultural machine in such a way that it removes or kills the weeds in a targeted manner.

16 Claims, 3 Drawing Sheets

(58) Field of Classification Search
USPC .......................................................... 47/1.7
See application file for complete search history.

(56) References Cited

U.S. PATENT DOCUMENTS

| | | | |
|---|---|---|---|
| 2017/0359943 A1* | 12/2017 | Calleija | A01M 7/006 |
| 2018/0279599 A1 | 10/2018 | Struve | |
| 2019/0144116 A1* | 5/2019 | Yuan | B64C 27/08 |
| | | | 701/3 |
| 2019/0239502 A1* | 8/2019 | Palomares | A01B 69/008 |
| 2020/0230633 A1* | 7/2020 | Serrat | G06K 9/78 |

OTHER PUBLICATIONS

International Preliminary Report on Patentability (Form PCT/IPEA/409) for International Application No. PCT/EP2020/054171 dated Nov. 6, 2020, 29 pages including English translation.

* cited by examiner

DEVICE AND METHOD FOR REMOVING OR KILLING WEEDS

This application is a 35 U.S.C. § 371 national phase filing of International Application No. PCT/EP2020/054171 filed on Feb. 18, 2020, and claims the benefit of Austrian Patent Application No. A60048/2019 filed on Feb. 26, 2019, wherein the disclosures of the foregoing applications are hereby incorporated by reference herein in their respective entireties.

The invention relates to a device and a method for removing or killing weeds, and an implement with a device of this kind.

In modern organic farming, but also in conventional farming, targeted weed control is a challenge, especially when it comes to special crops, particularly useful plants such as sugar beet, vegetables and the like, or ornamental plants such as perennials or cut flowers. Devices exist that are able to distinguish crops from weeds by means of optical camera control. In this case, an implement, for example a tractor or a robot with a system setup, drives over the field and a camera captures individual images of the crops and weeds. These images are processed in a computer in real time using artificial intelligence. The computer is supposed to determine the exact position of the crops and pass it on to the weed removal device. Under optimal conditions, this is successful and the machine removes the weeds without destroying the crop. However, these known systems only work satisfactorily when there are few weeds, the crop is clearly distinguishable from the weeds, and good light and wind conditions prevail.

Systems and methods for the automatic detection and selection of weeds are known from EP 3 357 332 A1 and DE 10 2017 205 293 A1, for example. Devices and methods relating to the detection of plants/the discharge of different agents and belonging to the prior art are known from US 2017/359934 A1, US 2017/112118 A1 and CN 204930106 U, among others.

Thus, one object of the invention is to enable real-time detection of the weeds and other soil properties even in the case of abundant weeds, as well as in poor visual and climatic conditions.

According to the invention, this object is solved by a device and a method according to the independent patent claims.

According to the invention, images are recorded directly in the field by at least one camera and transmitted as a whole or in partial images to at least one terminal. The terminal may be located directly on site, or on a network such as the internet. At the terminal/s, human users view these images and use input devices to determine the positions of crops, weeds or ground structures. This positional data is transmitted back to a weed removal device, enabling it to cultivate the soil without damaging the crops.

One embodiment according to the invention may provide a tractor or another implement, such as a robot, with the system setup, which travels over the field at a certain speed. A camera, which can also be attached to the front attachment of the tractor, captures individual images of the crops and weeds. These images are forwarded by a data processing unit such as a computer to a router, if necessary, which forwards the images of the plants wirelessly via radio, LTE, 5G, WLAN or the like to a server. Via an interface, people (teleworkers) can select the crops or weeds from their PC workstation (or tablet, mobile phone and the like) via mouse selection or touch screen interaction. The server compares the results and evaluates them statistically, if necessary. This sorts out misidentifications of plants and determines the correct position (x/y coordinate) of the crops and/or weeds. This result is transmitted back to the computer via the router, if necessary. In the meantime, the position of the tractor and thus also the position of the plants has changed in relation to the front camera. By means of software, unique points are identified on the individual images of the camera and the statistically evaluated result images of the teleworkers and assigned to each other. This allows the determined position (x/y coordinate) to be forwarded to the weed removal device, which finally removes the weeds.

The images can be transmitted via radio to a server, which provides the images to teleworkers worldwide via a web interface. By means of a simple login procedure on a website, any number of human users can thus participate in the plant detection. Plant detection can also be implemented as a game or captcha algorithm to get feedback from as many human users as possible.

Since several teleworkers are assigned the same tasks at the same time, the results can also be statistically evaluated by a server or by the data processing unit to eliminate misidentifications. Afterwards, the image with the position data can be transmitted back to the computer on site via radio. At time $t_0+\Delta t$, the information of the detected plants comes back from the teleworkers in the field while, if necessary, further images are continuously captured by a second camera.

The returned image of the first camera with the position data of the plant positions (x/y coordinate) can be superimposed by means of software with the continuously captured images of a second camera, which is rigidly connected to the weed removal device. This compensates for the change in position of the entire system from time $t_0$ to time $t_0+\Delta t$ and synchronises the position of the detected plants relative to the weed removal device. This absolute definition of the position of the plants allows the computer to correctly control the weed removal device.

In particular, a device according to the invention for removing or killing weeds comprises a first image capturing apparatus for capturing a first ground image, a data processing unit connected thereto and an agricultural machine controlled by the data processing unit, which is designed for the targeted removal or killing of weeds. The data processing unit, e.g. a computer, is configured to receive the first ground image from the first image capturing apparatus.

Further, the data processing unit is configured to receive manually determined position data from at least one connected terminal, which indicate the position of weeds and/or crops and/or ground structures, e.g. rows of plants, which have been detected in the first ground image by one or more users. Further, the data processing unit is configured to control the agricultural machine with the corrected position data in such a way that the weeds are removed or killed in a targeted manner.

The data processing unit may be configured to transmit the first ground image to at least one, preferably a plurality of, connected terminal/s directly or via a communication means and to receive the position data from at least one of these terminals. For example, the data processing unit and the terminals may be on a shared network, e.g. WLAN. However, the data processing unit may also transmit the first ground image to a server via a communication means and receive the position data from the server. In particular, the data processing unit, the server and the terminals may be located on the internet or another network. However, in case of a connection fault, it may also be provided that the data processing unit itself may be used as the point of input, for example by the driver of the implement.

In particular, the invention provides a purely local application, in which the data processing unit and the terminals of the users are on a shared network, e.g. a wireless ad hoc network. The users may be directly in the field or in the vicinity of the implement.

The invention may provide that a second image capturing apparatus, which is connected to the data processing unit, is provided for capturing a second ground image in order to allow continuous operation. The data processing unit is configured to receive the second ground image from the second image capturing apparatus and to superimpose it on the first ground image in order to obtain a one-dimensional or two-dimensional displacement vector. The displacement vector may then be used to correct the position data so that corrected position data are obtained. The agricultural machine may then be controlled with the corrected position data. This allows to compensate for inaccuracies that arise when the speed of the implement and the temporal distance between the capture of an image and the activation of the agricultural machine are not precisely adapted to one another.

The first and/or the second image capturing apparatus may be located in close proximity to the agricultural machine, preferably at a distance of below 1 m and may particularly preferably be mounted on or be part of the agricultural machine. The first image capturing apparatus and the agricultural machine may be arranged on a carrier device with a coupling device for the connection to a movable implement. Also the second image capturing apparatus and the agricultural machine may be arranged on a carrier device with a coupling device for the connection to a movable implement.

The distance from the first image capturing apparatus to the second image capturing apparatus may be more than 3 m, preferably more than 5 m, particularly preferably more than 7 m.

The agricultural machine may be a weeding tool for the targeted soil cultivation, a weed sprayer designed for the targeted soil cultivation or a weed burner designed for the targeted soil cultivation or the like.

Further, the invention comprises a movable implement with a device according to the invention for removing or killing weeds. Preferably, the implement may be autonomously movable. The device for removing or killing weeds may be arranged on the implement in such a way that the first image capturing apparatus is directed towards the ground in an angle of about 90° to the direction of travel in order to distinctly detect weeds and/or crops.

Alternatively, the device for removing or killing weeds may also be arranged on the implement in such a way that the first image capturing apparatus is directed straight ahead in an angle of preferably between about 5° and about 45° to the direction of travel in order to detect ground structures, in particular rows of plants, particularly well. In particular, it may be provided that the first image capturing apparatus is arranged centrally between the wheels of the implement. The angle of the first image capturing apparatus may be adjustable relative to the direction of travel.

The invention may provide that the device for removing or killing weeds is arranged on the implement in such a way that the first image capturing apparatus is located in front of the second image capturing apparatus in the direction of travel of the implement. In particular, the first image capturing apparatus may be arranged in front of the implement in the direction of travel and the second image capturing apparatus may be arranged behind the implement in the direction of travel.

It may be provided that, in operation, the maximum travelling speed of the implement is below 15 km/h, preferably below 10 km/h, and particularly preferably below 5 km/h, so that sufficient time remains for transmitting the datasets back and forth for the detection of the plants.

Further, the invention relates to a method for removing or killing weeds with an agricultural machine, which is controlled by a data processing unit and designed for removing or killing weeds in a targeted manner. A method according to the invention comprises at least the following steps:

In a first step, a first image capturing apparatus, which is connected to the data processing unit, captures a first ground image.

In a further step, the data processing unit receives manually determined position data from a connected terminal, which indicate the position of weeds and/or crops and/or ground structures, e.g. rows of plants, which have been detected in the first ground image by one or more users.

In a further step, the data processing unit controls the agricultural machine on the basis of the position data for removing or killing weeds in a targeted manner.

The invention may provide that the data processing unit transmits the first ground image to a plurality of connected terminals and receives the position data from at least one of these terminals. The data processing unit may transmit the first ground image to a server via a communication means and receive the position data from the server.

The data processing unit may also receive a second ground image from a second image capturing apparatus, superimpose it on the first ground image for determining a displacement vector, correct the position data for determining corrected position data by the displacement vector and control the agricultural machine with the corrected position data.

The server may transmit the first ground images to a plurality of connected terminals, receive the position data from at least one of the terminals and forward these position data to the data processing unit.

The server may also receive position data from multiple terminals, subject this plurality of position data to a statistical analysis, for example a determination of the average value and the standard deviation of the position data, and forward the result of the statistical analysis to the data processing unit. For example, the server may perform a determination of the average value and the standard deviation of the position data.

Further, the invention relates to a computer-readable storage medium, which comprises computer-readable instructions, which cause a data processing unit, which is connected to a device according to the invention/an implement according to the invention, to perform a method according to the invention.

The server does not need to be a physically existing component, but may also be a software server. In particular, it may be provided that the server is integrated into the data processing unit on the implement as a software server so that no further server is necessary, but the data processing unit takes over both roles.

In particular, a device according to the invention and a method according to the invention may also be used to detect one-dimensional ground structures such as plant rows (rows of plants) and to control the agricultural machine accordingly so that the soil next to the plant rows is cultivated. To this end, a camera may be positioned on the bottom of the implement between the wheels and oriented centrally towards the plant rows. A central line drawn on the camera lens may always be oriented towards the row a couple of meters in front of the camera. The captured image is transmitted to terminals and the manual users detect the positions of the plant row, which are transmitted back as position data. Only one-dimensional (left/right) position data have to be processed so that the detection and the processing are faster. Thus, the agricultural machine may cultivate the soil precisely between the plant rows where the weeds may be removed as well.

Further features according to the invention result from the patent claims, the figures and the description of the exemplary embodiments.

In the following, the invention is explained in more detail on the basis of exemplary embodiments. In the figures.

Figure 1:
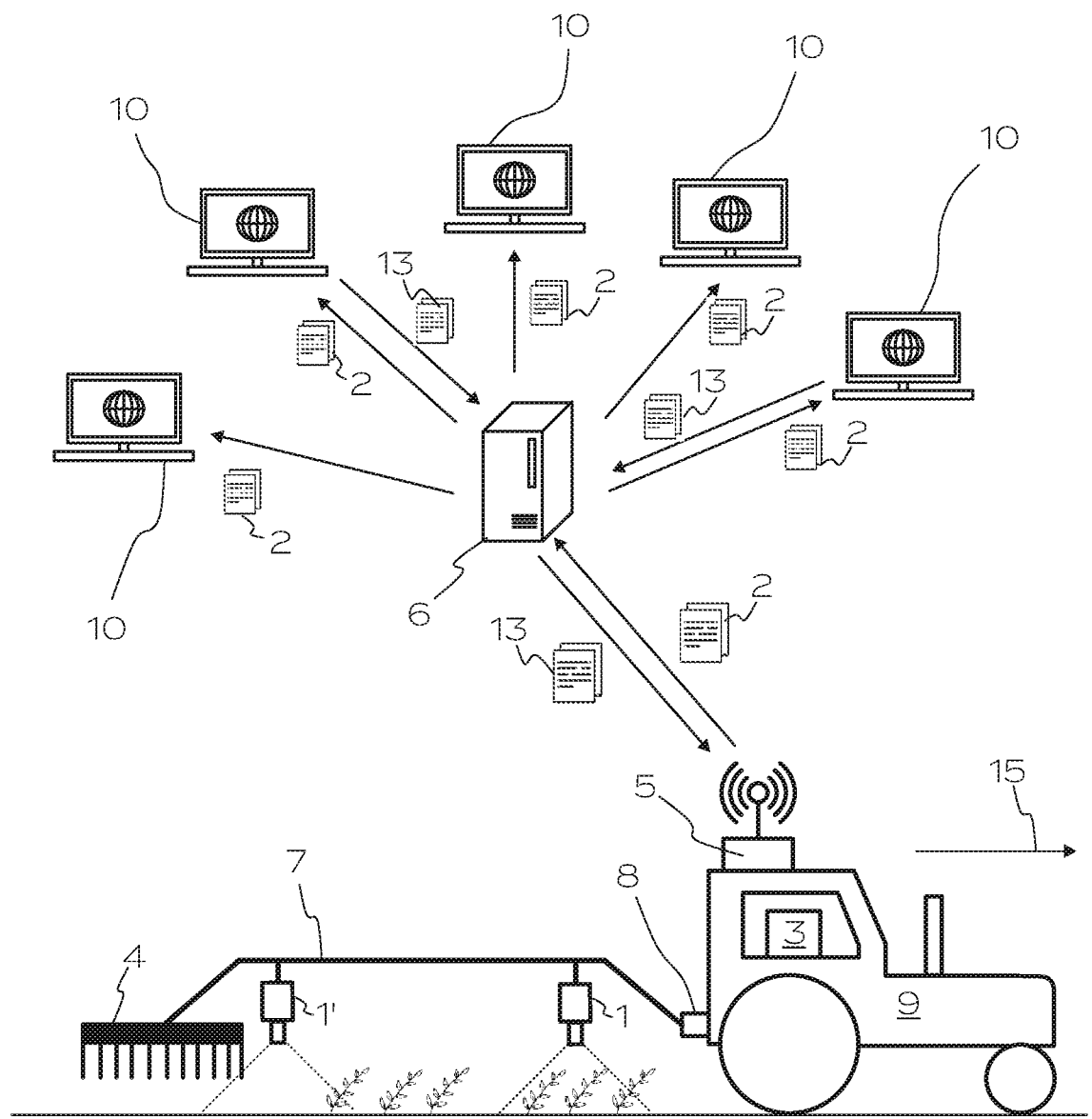
FIG. 1 shows a schematic view of a first embodiment of a device according to the invention.

FIG. 1 shows a schematic view of a first embodiment of a device according to the invention. The device comprises a carrier device 7 with a first image capturing apparatus 1 in the form of a camera and a second image capturing apparatus 1' in the form of a camera. The two cameras are arranged on the carrier device 7 along the direction of travel 15 of an implement 9, for example a tractor, here at a distance of about 4 m, and are directed downwards so that they can capture the vegetation on the ground.

The carrier device 7 is attached to the rear of the implement 9 via a coupling device 8. In this exemplary embodiment, both cameras 1, 1' are arranged behind the implement 9 in the direction of travel 15. The first image capturing apparatus 1 is arranged in front of the second image capturing apparatus 1' in the direction of travel 15.

An agricultural machine 4, which is designed for the targeted removal or killing of weeds, is located in close proximity to the second image capturing apparatus 1', i.e. at a distance of less than 0.5 m. In the present exemplary embodiment, it is an automatic weeding tool. It is controlled by a data processing unit 3 with x and y coordinates and automatically removes those plants located at this coordinate in an image captured by the second image capturing apparatus 1'. To this end, the agricultural machine 4 is connected to the data processing unit 3 via a data interface, either wirelessly or by wires.

In operation, the implement 9 moves along the direction of travel 9 with low speed, in the present exemplary embodiment with about 5 km/h. During the travel, the first image capturing apparatus 1 continuously captures first ground images 2 and transmits them to the data processing unit 3. In this exemplary embodiment, the schematically shown ground region covered by the cameras has a width of about 2.5 m and a length of about 3 m.

Via a communication means 5, e.g. a WLAN or LTE router, the data processing unit 3 transmits the first ground images 2 to a remote server 6 on the internet.

The server 6 distributes the first ground images 2 among a plurality of terminals 10, which are also on the internet. The terminals 10 may already have established a connection to the server 6 in advance and may be continuously connected to the server 6.

On the terminals 10, the ground images 2 are shown to human users. These users are persons with knowledge about crops and weeds, who can thus differentiate between crops and weeds in the ground images 2. For displaying the ground images 2, an x/y grid may be superimposed on them so that the users may simply indicate, in which of the grid blocks there are weeds. The users select those blocks in which there are weeds; these x and y coordinates are transmitted back from the terminals 10 to the server 6 as position data 13. It is not necessary for all terminals 10 to transmit back position data 13; however, what is important is that an answer is received within a short amount of time. The server 6 transmits the position data 13 back to the data processing unit 3.

Alternatively, it may be provided that the ground images 2 are displayed without a specific grid. In this case, the users determine the position data 13 via appropriate input devices, e.g. a mouse or a touch screen, which are then transmitted from the terminals 10 to the server 6.

In the present example, the implement 9 moves with a speed of 5 km/h in the direction of travel 15. The distance between the first image capturing apparatus 1 and the second image capturing apparatus is about 4 m. As a result, the second image capturing apparatus 1' reaches the location of the first ground image after about 3 seconds. This time is what it takes to obtain feedback from at least one of the terminals 10 regarding the position data 13 of weeds.

The data processing unit 3 receives the position data 13 transmitted by the server 6. If multiple position data sets 13 from different terminals are received, the data processing unit 3 calculates an average value therefrom.

In order to determine the actual position of the implement 4 relative to the ground, the data processing unit 3 now receives a second ground image 2' from the second image capturing apparatus 1'. Now, the data processing unit 3 superimposes the second ground image 2' on the first ground image 2 and determines a displacement vector 14 therefrom.

Figure 2:
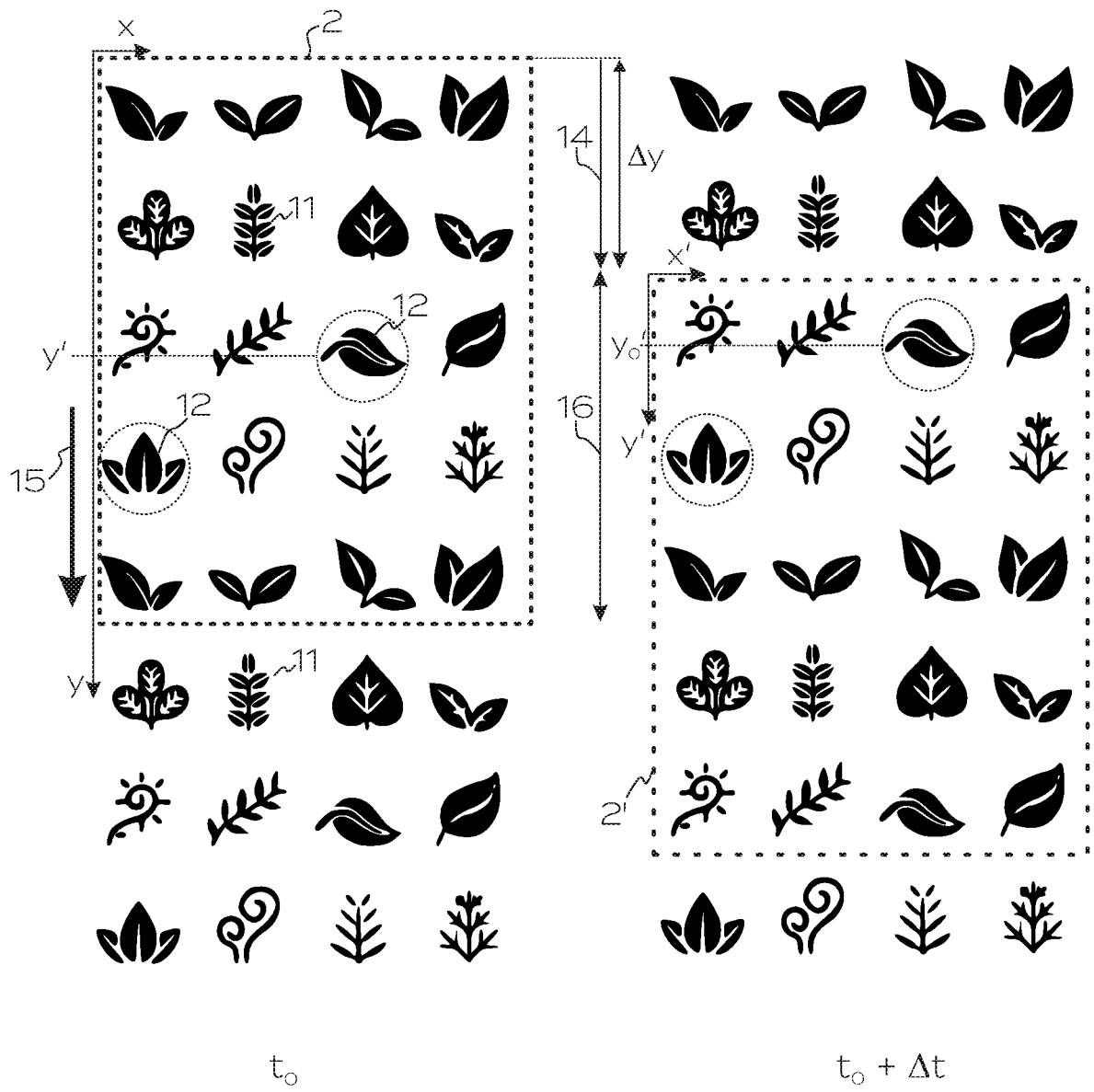
FIG. 2 shows a schematic view of a second embodiment of a device according to the invention.

FIG. 2 shows the determination of the displacement vector 14 from the two ground images 2, 2'. The left area shows the first ground image 2 at time $t_0$, in which two weeds 12 and one crop 11 were identified. One of the identified weeds 12 is located at position $x_0, y_0$. The implement 9 moves further in the direction of travel 15 and a few seconds later, at time $t_0+\Delta t$, the second ground image 2' is captured. However, the second ground image 2' is typically not identical to the first ground image 2 so that it would not be correct to remove the plant at position $x_0, y_0$. Therefore, the data processing unit 3 superimposes the two images by using conventional image processing libraries and determines an overlapping area 16, in which the images are identical. The displacement vector 14 is identified as the distance $\Delta y$, by which the two ground images 2, 2' are displaced relative to one another in the direction of travel 15.

Subsequently, the data processing unit corrects the position data 13 by the displacement vector 14. In other words: The x and y coordinates of the detected weed 12 are reduced by the displacement vector 14 in order to obtain corrected position data 13'. Now, the data processing unit 3 controls the agricultural machine 4 with the corrected position data 13' in such a way that it removes or chemically kills the detected weeds 12 at position $(x_0', y_0')=(x_0, y_0-\Delta y)$. Of course, this method is not limited to one-dimensional displacement vectors 14.

Figure 3:
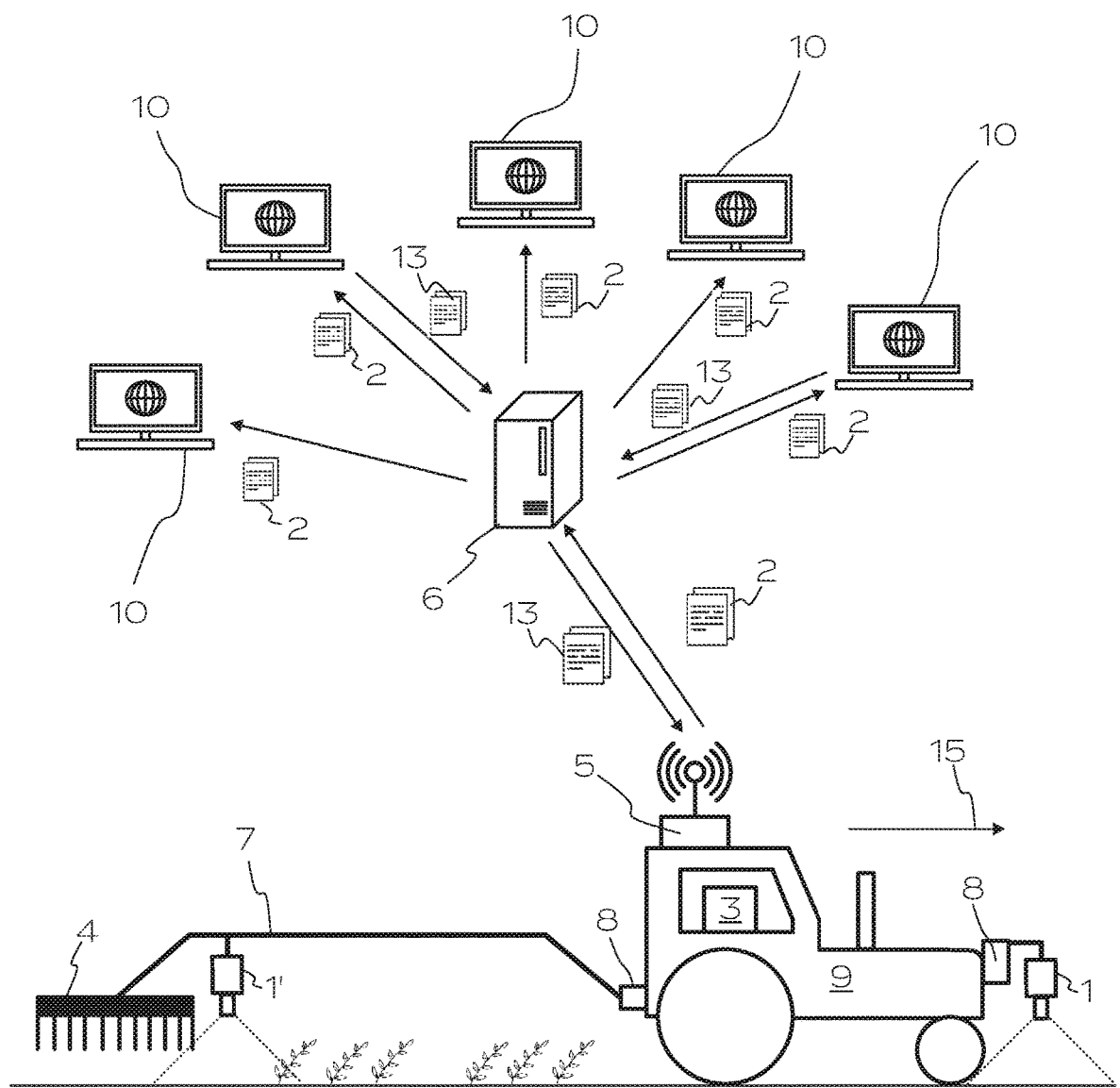
FIG. 3 shows a schematic view of the superposition and combination of the captured images.

FIG. 3 shows a further schematic view of an embodiment of a device according to the invention. Again, the device comprises a carrier device 7; however, only the second image capturing apparatus 1' in the form of a camera is arranged on it.

The first image capturing apparatus 1 is not arranged on the carrier device 7, but on a second coupling device 8 at the front of the implement 9. This is advantageous in that the entire length of the implement 9 can be taken advantage of in order to provide as much time as possible for the detection of the weeds. As a result, the carrier device 7 in this embodiment may be shorter in design or the implement 9 may be moved at an elevated speed. The further features of this exemplary embodiment correspond to those of the exemplary embodiment according to FIG. 1.

In a further embodiment, the implement may be equipped with only a single image capturing apparatus 1 in the form of a camera. In this embodiment, the implement stops, captures an image of the ground and waits for the feedback with the position data from the terminals before the agricultural machine cultivates the soil at the corresponding position data. Subsequently, the implement moves a defined distance and the next image is captured. This implementation is particularly useful if the implement is an autonomously movable vehicle, for example a robot.

However, the invention is not limited to the illustrated exemplary embodiments, but rather comprises all devices and methods in the context of the following patent claims.

LIST OF REFERENCE SIGNS

1, 1' Image capturing apparatus
2, 2' Ground image
3 Data processing unit
4 Agricultural machine
5 Communication means
6 Server
7 Carrier device
8 Coupling device
9 Movable implement
10 Terminal
11 Crop
12 Weeds
13, 13' Position data
14 Displacement vector
15 Direction of travel
16 Overlapping area

The invention claimed is:

1. A device for removing or killing weeds, comprising
a first image capturing apparatus for capturing a first ground image,
a second image capturing apparatus for capturing a second ground image,
a data processing unit connected thereto to the first image capturing apparatus and the second image capturing apparatus, and
an agricultural machine controlled by the data processing unit, which is designed for the targeted removal or killing of weeds,
characterized in that the data processing unit is configured to
receive the first ground image from the first image capturing apparatus,
transmit the first ground image to a plurality of connected terminals either directly or via a communication means,
receive the second ground image from the second image capturing apparatus and to superimpose it on the first ground image for determining a displacement vector,
receive manually determined position data from the plurality of connected terminals, which indicate the position of weeds and/or crops and/or ground structures, which have been detected in the first ground image by a plurality of users,
correct the position data by the displacement vector in order to obtain corrected position data,
on the basis of the corrected position data, control the agricultural machine in such a way that it removes or kills the weeds in a targeted manner.

2. The device according to claim 1, characterized in that the data processing unit is configured to transmit the first ground image to a server via a communication means and to receive the position data from the server.

3. The device according to claim 1, characterized in that the second image capturing apparatus is located in close proximity to the agricultural machine.

4. The device according to claim 1, characterized in that the first image capturing apparatus and the agricultural machine are arranged on a carrier device with a coupling device for the connection to a moveable implement.

5. The device according to claim 1, characterized in that the second image capturing apparatus and the agricultural machine are arranged on a carrier device with a coupling device for the connection to a moveable implement.

6. The device according to claim 1, characterized in that the distance from the first image capturing apparatus to the second image capturing apparatus is more than 3 m.

7. The device according to claim 1, characterized in that the agricultural machine is a weeding tool designed for the targeted soil cultivation, a weed sprayer designed for the targeted soil cultivation or a weed burner designed for the targeted soil cultivation.

8. A moveable implement comprising a device for removing or killing weeds according to claim 1.

9. The movable implement according to claim 8, characterized in that the device for removing or killing weeds is arranged on the implement in such a way that the first image capturing apparatus
    a. is directed towards the ground in an angle of 90° to the direction of travel in order to detect weeds and/or crops, or
    b. is directed straight ahead in an angle of preferably between 5° and 45° to the direction of travel in order to detect ground structures such as rows of plants.

10. The movable implement according to claim 8, characterized in that the first image capturing apparatus is located in front of the second image capturing apparatus in the direction of travel of the implement.

11. The movable implement according to claim 8, characterized in that the first image capturing apparatus is arranged in front of the implement in the direction of travel and in that the second image capturing apparatus is arranged behind the implement in the direction of travel.

12. The movable implement according to claim 8, characterized in that, in operation, the maximum travelling speed of the implement is below 15 km/h.

13. A method for removing or killing weeds with an agricultural machine, which is controlled by a data processing unit and is designed for the targeted removal or killing of weeds, comprising the following steps:
    a. a first image capturing apparatus, which is connected to the data processing unit, capturing a first ground image,
    b. transmitting the first ground image to a plurality of connected terminals,
    c. the data processing unit receiving manually determined position data from the plurality of connected terminals, which indicate the position of weeds and/or crops and/or ground structures, which have been detected in the first ground image by a plurality of users,
    d. the data processing unit receiving a second ground image from a second image capturing apparatus and superimposing the second ground image on the first ground image for determining a displacement vector;

e. the data processing unit correcting the position data by the displacement vector for determining corrected position data; and f. the data processing unit controlling the agricultural machine on the basis of the corrected position data for removing or killing weeds in a targeted manner.

14. The method according to claim 13, characterized in that the data processing unit transmits the first ground image to a server via a communication means and receives the position data from the server.

15. The method according to claim 14, characterized in that the server transmits the first ground images to the plurality of connected terminals, receives position data from at least one of the connected terminals and forwards these position data to the data processing unit.

16. The method according to claim 15, characterized in that the server receives position data from multiple terminals, subjects this plurality of position data to a statistical analysis and forwards the result of the statistical analysis to the data processing unit.

\* \* \* \* \*